United States Patent [19]
Dulaney et al.

[11] Patent Number: 6,049,058
[45] Date of Patent: Apr. 11, 2000

[54] LASER PEENING PROCESS AND APPARATUS WITH UNIFORM PRESSURE PULSE CONFINEMENT

[75] Inventors: Jeffrey L. Dulaney, Dublin; Allan H. Clauer, Worthington; Steven M. Toller, Grove City, all of Ohio

[73] Assignee: LSP Technologies, Inc., Dublin, Ohio

[21] Appl. No.: 09/211,568

[22] Filed: Dec. 15, 1998

[51] Int. Cl.[7] .................................................. B23K 26/00
[52] U.S. Cl. ................................. 219/121.84; 219/121.6; 219/121.85
[58] Field of Search ............................ 219/121.6, 121.68, 219/121.69, 121.84, 121.85, 121.83; 148/525, 565; 427/554, 596

[56] References Cited

U.S. PATENT DOCUMENTS

| | | | |
|---|---|---|---|
| 3,850,698 | 11/1974 | Mallozzi et al. | 148/525 X |
| 5,131,957 | 7/1992 | Epstein et al. | 148/565 |
| 5,571,575 | 11/1996 | Takayanagi | 427/554 X |
| 5,674,328 | 10/1997 | Mannava et al. | 219/121.85 X |
| 5,741,559 | 4/1998 | Dulaney | 427/596 X |
| 5,744,781 | 4/1998 | Yeaton | 219/121.84 |
| 5,928,534 | 7/1999 | Flis et al. | 219/121.85 X |

FOREIGN PATENT DOCUMENTS 2239553  12/1998  Canada .

OTHER PUBLICATIONS

Hong et al., "Confining Medium and Absorptive Overlay: Their Effects on a Laser–induced Shock Wave," Optics and Lasers in Engineering, vol. 29, 1998, pp. 447–455.

Laser Generation of 100–kbar Shock Waves in Solids, by Craig T. Walters (3 pages), 1992, in Shock Compression of Condensed Matter 1991, pp. 797–799.

*Primary Examiner*—Gregory Mills
*Attorney, Agent, or Firm*—Randall J. Knuth

[57] ABSTRACT

A method and apparatus for improving properties of a solid material by providing shock waves therethrough. Laser shock processing is used to provide the shock waves. The method includes applying a transparent overlay to the solid material to be worked. The solid material or overlay is vibrated to release any gas bubbles or solid debris within the transparent layer which could cause localized non-uniform confinement of a pressure pulse applied for a workpiece thereby causing irregularities in the workpiece surface. A pulse of coherent laser energy is the directed to the coated portion of the solid material to create a shock wave. Additionally, the method may include adding a wetting agent or controlling the temperature of the overlay material to reduce the concentration of gas bubbles therein.

36 Claims, 2 Drawing Sheets

LASER PEENING PROCESS AND APPARATUS WITH UNIFORM PRESSURE PULSE CONFINEMENT

BACKGROUND OF THE INVENTION

1. Field of the Invention

The present invention relates to the use of coherent energy pulses, as from high power pulsed lasers, in the shock processing of solid materials, and, more particularly, to methods and apparatus for pressure pulse confinement within overlay material during operation. The invention is especially useful for enhancing or creating desired physical properties such as hardness, strength, and fatigue strength.

2. Description of the Related Art

Known methods for the shock processing of solid materials typically involve the use of high explosive materials in contact with the workpiece. High explosive materials or high pressure gases are used to accelerate a plate that strikes the solid to produce shock waves therein. Shot peening is another widely known and accepted process for improving the fatigue, hardness, and corrosion resistance properties of materials by impact treatment of their surfaces.

Shock processing with coherent radiation has several advantages over what has been done before. For example, the source of the radiation is highly controllable and reproducible. The radiation is easily focused on preselected surface areas and the operating mode is easily changed. This allows flexibility in the desired shocking pressure and careful control over the workpiece area to be shocked. Workpieces immersed in hostile environments, such as high temperature and high vacuum can be shock processed. Additionally, it is easy to shock the workpiece repetitively.

Laser peening (hereinafter referred to as laser shock processing) utilizes two overlays: a transparent overlay (usually water) and an opaque overlay (usually an oil-based or acrylic-based black paint). During processing, a laser beam is directed to pass through the water overlay and is absorbed by the black paint, causing a rapid vaporization of the paint surface and the generation of a high-amplitude shock wave. The shock wave cold works the surface of the part and creates compressive residual stresses, which provide an increase in fatigue properties of the part. A workpiece is typically processed by processing a matrix of overlapping spots that cover the fatigue critical zone of the part.

A problem in the art of laser shock processing is the production of irregularities on the surface of a workpiece during processing. The irregularities are due to non-uniform or uneven containment of a pressure pulse applied to the surface of a workpiece. These irregularities appear as visible hemispherical bosses of unprocessed areas on the surface of workpiece.

The problem of pressure pulse containment within the transparent overlay material utilized in laser shock processing can be traced back to at least 1976. An example of a reference documenting the problem of pressure pulse containment is a French reference by P. Forget et. al., "Laser Shock Surface Treatment of Ni-Based Superalloys," *Materials and Manufacturing Processes*, Vol.5., No. 4, pages 501–528 (1990).

What is needed in the art is a laser shock process that is highly repeatable without irregularities in the applied pressure.

SUMMARY OF THE INVENTION

The present invention provides a method of laser shock processing that can be used in a production environment that significantly reduces gas bubbles dissolved in the transparent overlay or attached to the workpiece. The method includes the steps of applying a transparent overlay such as water over the workpiece and reducing the concentration of gas bubbles in the transparent overlay material. Reduction of the concentration of gas bubbles takes place by means of vibration, temperature control, or the addition of wetting agents. The laser is then fired directly through the transparent overlay and onto the workpiece. The entire sequence and event timing is controlled by a preprogrammed microprocessor such as found in a personal computer. The sequences are repeated for each spot to be processed along the workpiece surface.

The invention comprises, in one form thereof, a method of improving properties of a solid material by providing shock waves therein. The method includes the steps of applying a transparent overlay material to the solid material, reducing the concentration of gas bubbles in the transparent overlay material, and directing a pulse of coherent energy to the solid material through the transparent overlay material to create a shock wave. In one particular embodiment, the method includes the step of confining a substantially uniform pressure pulse which is applied to the solid material.

The invention comprises, in another form thereof, a method of improving properties of a solid material by providing shock waves therein. The method includes the steps of applying a transparent overlay material to the solid material and applying sonic waves to the solid material into and through the transparent overlay material to shake loose gas bubbles attached to the solid material. A pulse of coherent energy is directed to the solid material through the transparent overlay material to create a shock wave. In one particular embodiment, the method includes the step of confining a substantially uniform pressure pulse which is applied to the solid material.

The invention comprises, in yet another form thereof, an apparatus for improving properties of a workpiece by providing shock waves therein. The apparatus includes a transparent overlay applicator for applying a transparent overlay to the workpiece and a vibration means to vibrate the workpiece to shake loose any gas bubbles attached to workpiece. A laser is operatively associated with said transparent overlay applicator to provide a laser beam through the liquid transparent overlay to create a shock wave on the workpiece.

The invention comprises, in still another form thereof, an apparatus for improving properties of a workpiece by providing shock waves therein. The apparatus includes a transparent overlay applicator for applying a transparent overlay to the workpiece over a coated portion of the workpiece and means for changing the temperature of the transparent overlay. The changing means is connected to the transparent overlay applicator. A laser is operatively associated with said transparent overlay applicator to provide a laser beam through the transparent overlay to create a shock wave on the workpiece.

The invention comprises, in another form thereof, a method of improving properties of a solid material by providing shock waves therein, comprising the steps of: mixing a wetting agent into a transparent overlay material to reduce dissolved gas bubbles; applying the transparent overlay material to the solid material, the wetting agent releasing gas bubbles attached to the solid material; and directing a pulse of coherent energy to the solid material to create a shock wave. In one particular embodiment, the method includes the step of confining a substantially uniform pressure pulse which is applied to the solid material.

An advantage of the present invention is the confinement of a substantially uniform pressure pulse which is applied to a workpiece. Through experimentation, it was determined that gas bubbles or other irregularities in the overlay, either floating or attached to the workpiece, prevent uniform containment of a pressure pulse. Consequently, a non-uniform containment of a pressure pulse results in a non-uniform pressure pulse applied to the workpiece. The present invention contains a substantially uniform pressure pulse by removing gas bubbles and debris from the transparent overlay. Therefore, a substantially uniform pressure pulse is applied to a workpiece.

Another advantage of the present invention is the elimination of irregularities produced on the surface of a workpiece during laser shock processing. The irregularities on the surface of a workpiece during laser shock processing are attributed to the non-uniform confinement of a pressure pulse direct or applied to a workpiece. In a particular embodiment, a substantially uniform pressure pulse is applied to a workpiece. Consequently, the substantially uniform pressure pulse applied to a workpiece eliminates irregularities produced on the surface of a workpiece during laser shock processing.

Yet another advantage of the present invention is that by reducing the concentration of gas bubbles in the transparent overlay, a more uniformly shocked workpiece results.

A further advantage of the present invention is the utilization of a flowing, transparent liquid overlay which permits vibration to be transmitted to the workpiece. These vibrations release gas bubbles and debris attached to the workpiece, thereby creating a more uniform and cleaner target.

Another advantage of the present invention is the utilization of an image processor to determine the concentration of gas bubbles or debris attached or floating above the workpiece. The image processor may further determine other workpiece characteristics such as temperature, size, placement, stress and deformation.

Yet a further advantage of the present invention is that the process maintains uniform material response by controlling the temperature of the workpiece and overlays. The laser shock processing system now can be adapted to manufacturing process workloads and requirements.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrate one preferred embodiment of the invention, in one form, and such exemplifications are not to be construed as limiting the scope of the invention in any manner.

DETAILED DESCRIPTION OF THE INVENTION

Figure 1:
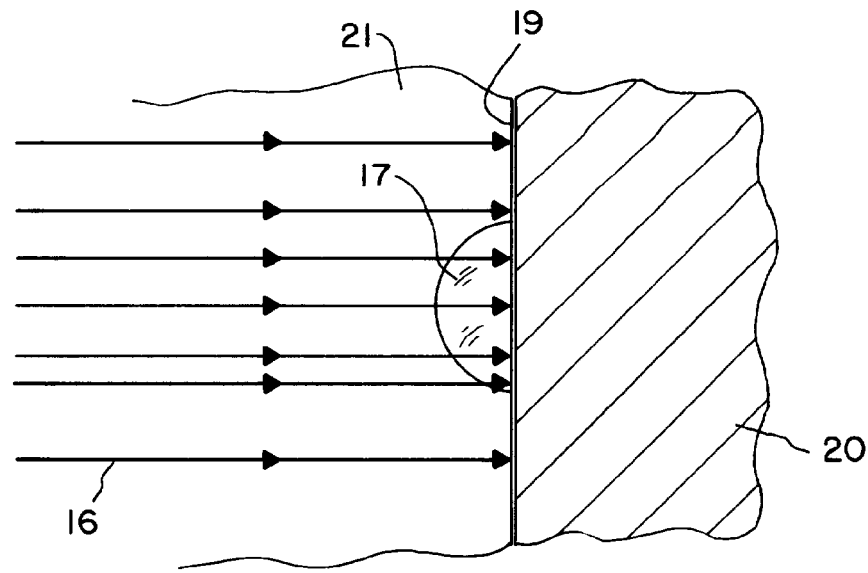
FIG. 1 is an enlarged fragmentary view of a workpiece and an associated gas bubble during the laser shock process.

The improvements in fatigue life produced by laser shock processing are the results of residual compressive stresses developed in the irradiated surface retarding fatigue crack initiation and/or slowing the crack propagation rate. A crack front is the leading edge of a crack as it propagates through a solid material. Changes in the shape of a crack front and slowing of the crack growth rate when the crack front encounters the laser shocked zone in a laser shock processing condition have been shown. Laser shock processing is an effective method of increasing fatigue life in metals by treating fatigue critical regions.

For a more thorough background in the prior history of laser shock processing and that of high power processing of engineered materials, reference can be made to U.S. Pat. No. 5,131,957, such patent explicitly hereby incorporated by reference. This patent also shows a type of laser and laser circuit adaptable for use with the present invention. Another type of laser adaptable for use with the present invention is that of a Nd-Glass Laser manufactured by LSP Technologies of Dublin, Ohio.

Overlays are applied to the surface of the target workpiece being laser shock processed. These overlay materials may be of two types, one transparent to laser radiation and the other opaque to laser radiation. They may be used either alone or in combination with each other, but it is preferred that they be used in combination with the opaque overlay adjacent the workpiece, and the outer transparent overlay being adjacent the opaque overlay.

The transparent overlay material should be substantially transparent to the radiation. Useful transparent overlay materials include water, water-based solutions, other non-corrosive liquids, glass, quartz, sodium silicate, fused silica, potassium chloride, sodium chloride, polyethylene, fluoroplastics, nitrocellulose, and mixtures thereof. Fluoroplastics, as they are known by ASTM nomenclature, are parallinic hydrocarbon polymers in which all or part of each hydrogen atom has been replaced with a fluorine atom. Another halogen, chlorine, can also be part of the structure of a fluoroplastic. By order of decreasing fluorine substitution and increasing processability, these materials include polytetrafluoroethylene (PTFE); fluorinated ethylenepropylene (FEP): the chlorotrifluorethylenes (CTFE); and polyvinylidine fluoride ($PVF_2$). Also available is a variety of copolymers of both halogenated and fluorinated hydrocarbons, including fluorinated elastomers. Additionally, the transparent overlay could be a gel comprised of one or more of the above materials or others.

Where used, the opaque overlay material may be substantially opaque to the radiation. Useful opaque overlay materials include paint, pentacrythritol tetranitrate (PETN); bismuth, aluminum, iron, lead, cadmium, tin, zinc, graphite; and mixtures of charcoal or carbon black with various transparent materials such as mixtures of nitrocellulose and potassium perchlorate or potassium nitrate. Optionally, a layer of another overlay material may be attached to the layer of substantially opaque material. The outer layer may be either transparent or opaque. The term "transparent" in this application is defined as meaning pervious to the laser beam utilized, not automatically or necessarily pervious to visible light. A typical overlay is about 10 to 20,000 micrometers ($\mu$m) thick.

A consequence of using a liquid transparent overlay is that gasses or debris may be dissolved in the overlay. Gas bubbles in the transparent overlay provide a gap or void between the workpiece and the transparent overlay. The effect of the presence of a gas bubble or debris on the surface of a workpiece during laser shock processing has been determined to affect the uniformity of a pressure pulse applied to a workpiece.

The effect on the pressure pulse applied to a workpiece when a gas bubble or debris is present in the transparent overlay is similar to the effect on a pressure pulse applied to a workpiece in the absence of a transparent overlay. The intensity of a pressure pulse applied to the workpiece is approximately one order of magnitude less in the absence of a transparent overlay as compared with the presence of a transparent overlay. A recitation of the correlation of pressure pulse to the absence or presence of a transparent overlay can be found in the article, Walters, *Laser Generation of 100-kbar Shock Waves in Solids*, Shock Compression of Condensed Matters, 797 (1991).

When the opaque overlay is vaporized and forms a plasma during laser shock processing, the resulting plasma will expand to fill the gas bubble's void. As a result, the pressure pulse applied to the workpiece at a locus of a gas bubble will be less than the pressure pulse applied at a locus without a gas bubble. Where there is no gas bubble, the plasma is confined directly against the workpiece surface by the transparent overlay and must immediately expand against the resistance of the transparent overlay. This creates the high shock laser pressure required by the laser peening process. Consequently, the presence of gas or debris causes irregularities on the surface of a workpiece during processing.

FIG. 1 illustrates the current problem. Opaque overlay 19 is applied to workpiece 20. A layer of transparent overlay material 21 covers a portion of workpiece 20. During laser shock processing, transparent overlay 21 helps maintain even pressure over the opaque layer 19.

Gas bubble 17 is located on the surface of workpiece 20. During laser shock processing, a beam of coherent energy 16 passes through transparent overlay 21 and gas bubble 17 and is absorbed by opaque overlay 19. Gas bubble 17 prevents the containment of a uniform pressure pulse applied to the surface of workpiece 20. In the area on workpiece 20 where bubble 17 is located, transparent overlay 21 fails to contain the intensity of the pressure pulse at the same high level as compared with the intensity of the pressure pulse contained in the area without the bubble. The result of a lower intensity of a pressure pulse applied to workpiece 20 below gas bubble 17 is a visible hemispherical boss of unprocessed area on the surface of workpiece 20 where gas bubble 17 resides.

Figure 2:
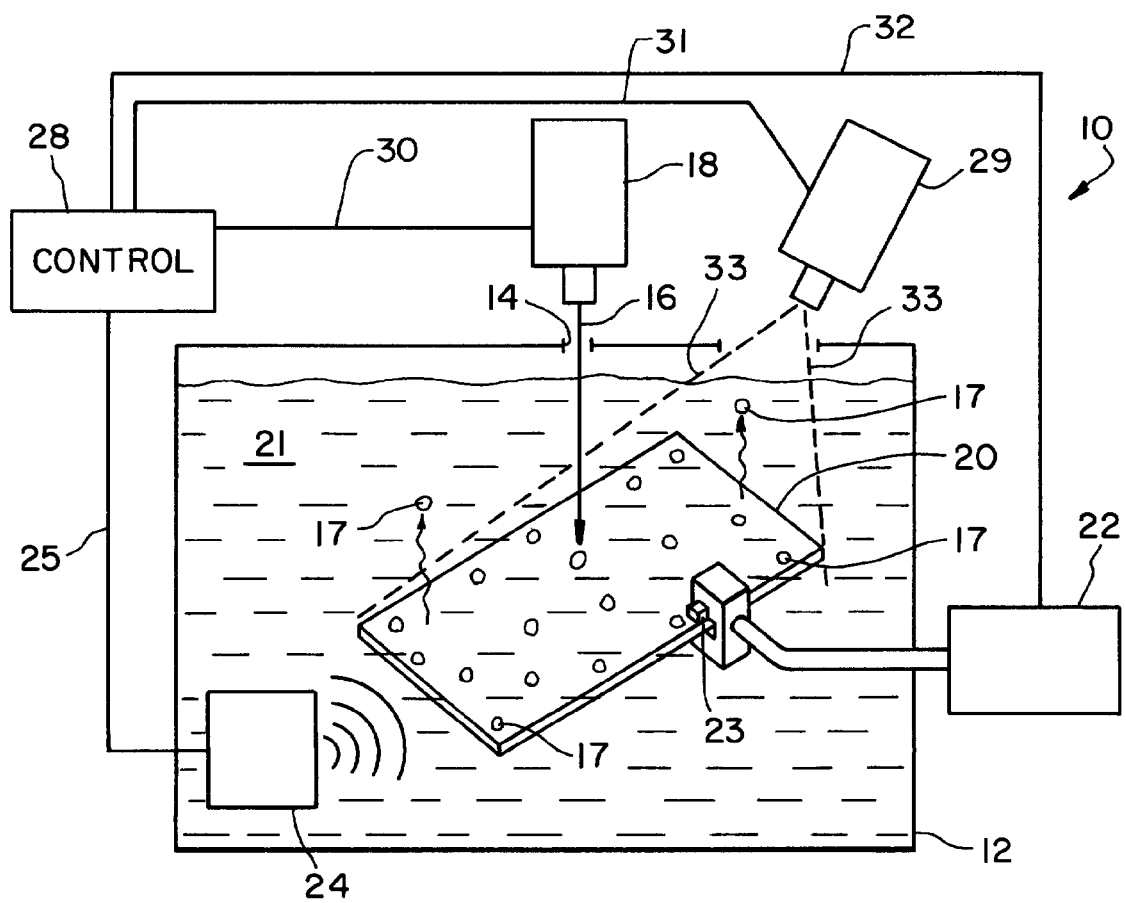
FIG. 2 is a diagrammatic view of one embodiment of the present invention.

Referring now to FIG. 2, there is shown one embodiment of laser processing system 10 of the present invention, including a target chamber 12 in which the laser shock process takes place. In this embodiment, the entire workpiece 20 is disposed in transparent overlay material 21. If necessary, target chamber 12 may be placed under vacuum by a vacuum pump (not shown).

Transparent overlay material 21 should be substantially transparent to the radiation as discussed above, water being the preferred overlay material.

The target chamber 12 includes an opening 14 for a laser beam 16 created by laser 18, a source of coherent energy. Laser 18, by way of example, may be a high power pulsed laser system capable of delivering more than approximately 10 joules in 5 to 100 nanoseconds. The laser pulse length and focus of the laser beam may be adjusted as known in the art. Shown in FIG. 2, a workpiece 20 is held in position within target chamber 12 by means of a positioning mechanism 22. Positioning mechanism 22 may be of the type of a robotically controlled arm or other apparatus to precisely position workpiece 20 relative to the operational elements of laser shock system 10.

Positioning mechanism 22 also includes a temperature sensor 23 that is in heat transfer contact with workpiece 20. This permits temperature sensor 23 to obtain an accurate temperature reading of workpiece 20.

Reduction of gas bubbles in this embodiment takes place by the use of means, such as vibrator 24. Vibrator 24 may operate at a number of different frequencies, to apply vibration energy to workpiece 20 via transparent overlay layer 21. The vibration energy from vibrator 24 causes gas bubbles 17 attached to workpiece 20 to detach therefrom. Such detached gas bubbles will then float to the top surface of transparent overlay layer 21 and burst, thereby reducing the concentration of gas bubbles dissolved in layer 21 and attached to workpiece 20. Vibrator 24 could operate in the sonic or ultrasonic frequency. An additional benefit to using an ultrasonic frequency vibrator would be that debris attached to workpiece 20 could also be removed along with gas bubbles 17.

A provision would need to be made to filter and remove overlay debris from the liquid in real time to keep debris from flowing over the process area. To further eliminate gas from the liquid, a vacuum could be maintained over the liquid surface in a storage tank.

The means of applying vibration energy to workpiece 20 could also be done via operation of positioning mechanism 22. In this function, positioning mechanism 22 would include a shaker, such as those found on paint shaking apparatus, or sonic or ultrasonic device, to vibrate workpiece 20 to remove the attached gas bubbles. The vibration energy can be sonic or ultrasonic.

A control unit, such as controller 28, is operatively associated with each of laser 18, positioning mechanism 22, and temperature sensor 23, and vibrator 24. Controller 28 controls the operation and timing of each of laser 18, vibrator 24 and positioning mechanism 22 to ensure proper sequence and timing of system 10. Shown in FIG. 2, controller 28 is connected to laser 18, positioning mechanism 22, and vibrator 24 via control lines 30, 32, and 25, respectively. Controller 28, in one embodiment, may be a programmed personal computer or microprocessor.

Controller 28 is in communication with temperature sensor 23 via line 32, although it could be possible for communication through a separate line.

System 10 additionally includes an image processor device 29, connected by a line 31 to controller 28. Image processor 29 is used to determine, such as by utilizing contrast analysis or other equivalent means, the amount or concentration of gas bubbles 17 or other debris either attached or floating above workpiece 20 (FIG. 2). If the concentration of gas bubbles 17 or debris determined by image processor 29 is above a certain threshold or predetermined limit, controller 28 can take a number of actions. Based on the amount of gas bubbles 17 determined by image processor 29, controller 28 can selectively activate the various means of gas bubble reduction if needed, i.e., selectively operate vibrator 24 or positioning mechanism 22, add selective wetting agents, and/or change the temperature of workpiece 20 or transparent overlay 21. Additionally, controller 28 could flush workpiece 20 with additional transparent overlay 21 as in FIG. 4.

Further, image processor 29 can determine whether a particular workpiece 20 is properly positioned by positioning mechanism 22, within the boundary of the image processor's sight range (as defined by dashed lines 33). Image processor may utilize computerized edge sight algorithms, such as used in conventional computerized vision apparatus for computer controlled welding equipment and the like. By determining if the edges of workpiece 20 are properly positioned, controller 28 can make a decision as to whether workpiece 20 is properly positioned for the lasering operation.

Image processor 29 can also directly sense conditions of workpiece 20 for other surface features or irregularities before and after processing so as to act as a quality control unit. For example, the system could assure that the overlay materials are properly applied. Various thermal or pressure sensitive coatings could also be first applied to workpiece 20, thereby enabling image processor 29 to directly determine the effects of the process (such as stress, deformation, and temperature) on workpiece 20.

Figure 3:
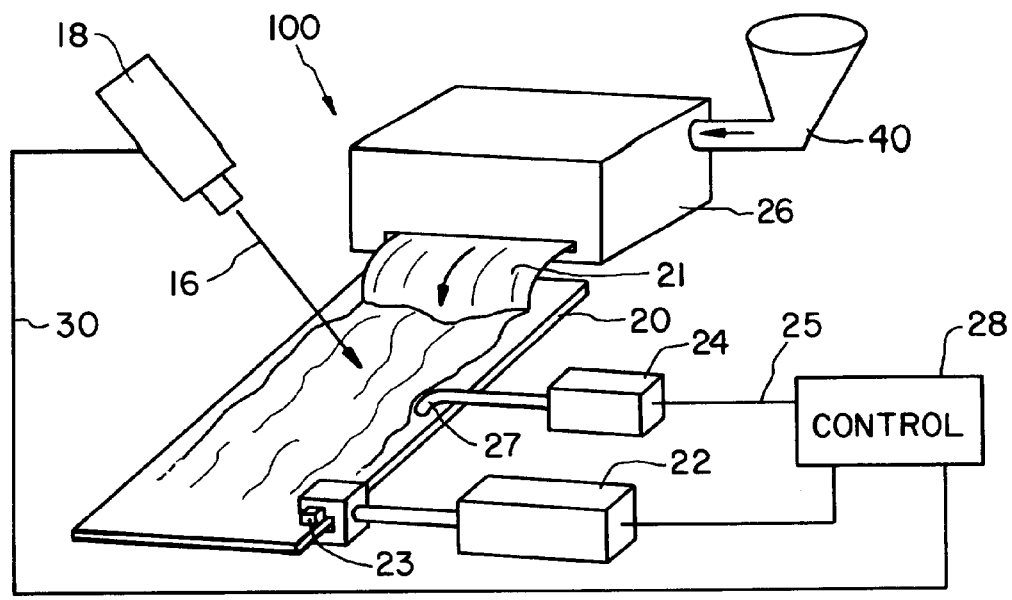
FIG. 3 is a diagrammatic view of another form of the present invention.

FIG. 3 shows another embodiment of a laser processing system 100 in which the laser processing does not necessarily take place within a target chamber 12. In this case, system 100 includes a transparent overlay applicator 26 that applies the fluid or liquid transparent overlay 21 to workpiece 20 over the portion to be processed. The application of transparent overlay material 21 may comprise applying the transparent overlay material continuously before and during the directing of the laser energy pulse.

Applicator 26, as shown in FIG. 3, distributes a relatively wide and consistently thick layer of transparent overlay material 21 over workpiece 20. In this embodiment, vibrator 24 is not totally submerged within overlay material 21. Vibrator 24 includes a sonic head 27 that may either be in contact with transparent overlay material 21 or workpiece 20 to reduce the concentration of gas bubbles in overlay material 21.

Another way to reduce the concentration of gas bubbles in overlay material 21 is by the addition of a wetting agent or surfactant. Such an agent could be added to transparent overlay material 21 as by mixing it within transparent overlay applicator 26 as shown with hopper 40 (FIG. 3). Various wetting agents or surfactants could be mixed with overlay material 21 to reduce its surface tension. Such action would reduce and prevent gas bubbles from clinging to workpiece 20. Numerous wetting agents or surfactants may be used including materials having both ionic and covalent properties. Anionic, nonionic, and cationic wetting agents can be utilized. Examples of polar solubilizing groups in anionic wetting agents include carboxylate, sulfonate, sulfate and phosphate. Nonionic agents include materials such as ethoxylates, and ethylene oxide and propylene oxide block polymers. Cationic agents include amines and corrosion inhibiting wetting agents such as quaternary ammonium compounds. These agents can be used in various combinations or with other additives.

Other wetting agents could be commercial detergents or other additive agents that would also reduce the surface tension of the transparent overlay material 21. Additionally, application of water conditioners could be used to reduce the surface tension of transparent overlay material 21.

Transparent overlay materials other than water could be used, such as shear thinning or thixotropic materials. These materials flow when vibrated or shaken, but on elimination of such vibration, setup to a solid or semi-solid consistency. The advantage of this type of material is that it can be applied in a number of ways, i.e., brushing, rolling, spraying, flowing, but once on the target surface, it will stay in place and tend not to sag or run. Vibration of workpiece 20 or the transparent overlay 21 will cause overlay 21 to flow and reduce the amount of entrained gas bubbles.

Types of materials that display these characteristics include gels of emulsions or colloidal suspensions. The colloidal suspensions could consist of dispersions of solid particles such as fumed silica in aqueous, organic, or silicone liquid carriers. The emulsions could include water and oils, or other liquid combinations in various concentrations.

Figure 4:
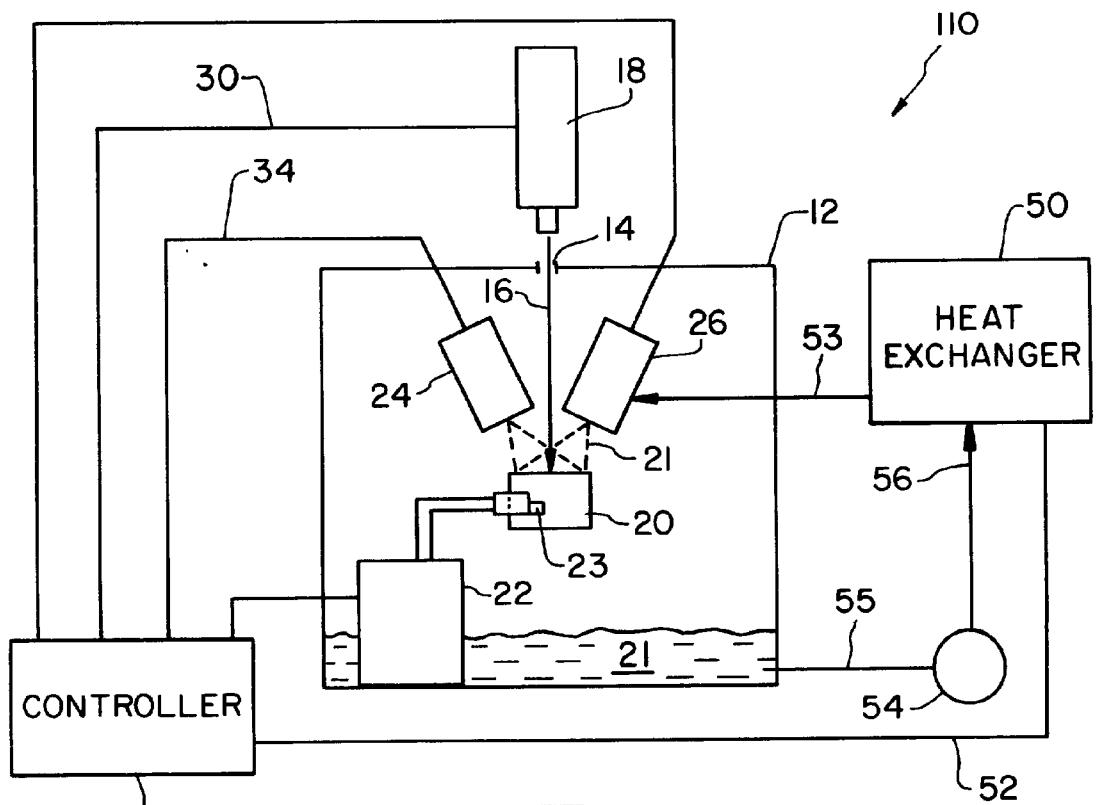
FIG. 4 is a diagrammatic view of another form of the present invention.

FIG. 4 shows yet another embodiment of a laser processing system 110 having a material applicator 24 for applying an energy absorbing, opaque material onto workpiece 20 to create a coated portion. Material applicator 24 may be that of a solenoid operated painting station or other construction such as a jet spray or aerosol unit to provide a small coated area onto workpiece 20. The material utilized by material applicator 24 is an energy absorbing material, preferably that of a black, water-based paint such as 1000 F AQUATEMP™ from Zynolite Product Company of Carson, Calif. Alternatively, other types of opaque coatings may be used such as those discussed above. In system 110 depicted by FIG. 4, the concentration of gas bubbles in transparent overlay material 21 is reduced by temperature control. By careful control of transparent overlay 21 parameters such as temperature, flow rate, and liquid purity, a reduction of gas bubbles dissolved in the overlay is observed. Temperature has been known to effect the adhesion of the opaque overlay because of the difference in expansion coefficients between the opaque overlay and workpiece 20. It has been noticed that if the opaque overlay is applied at room temperature and then positioned in a water stream that is 7–8 Kelvin lower in temperature, the opaque layer will flake much more easily after lasering, and gas bubbles tended to form on the part surface.

As shown in FIG. 4, system 110 utilizes a heat exchanger 50 to vary the transparent overlay material 21 at a preselected temperature. Heat exchanger 50 is connected by a line 56 to a pump 54. Pump 54, connected to target chamber 12 by a line 55, is utilized to pump transparent overlay material 21 found on the bottom of target chamber 12 through lines 55 and 56, heat exchanger 50 and out through a line 53 connected to transparent overlay applicator 26. Heat exchanger 50 is controlled by controller 28 through a line 52. Depending on the temperature signal from temperature sensor 23, controller 28 will either activate heat exchanger 50 to heat or cool the transparent overlay material 21 flowing therethrough, or turn off heat exchanger 50 so that no temperature change of overlay material 21 takes place.

Alternatively, other ways of heating or cooling transparent overlay material could be utilized. For example, hot and cold overlay material or water could be mixed or added together to achieve a desired transparent overlay temperature. By controlling temperature, a more uniform material response to the laser processing system occurs and gas bubbles 17 on the surface of workpiece 20 are reduced. This embodiment may be used in conjunction with the embodiments shown in FIGS. 2 and 3.

A control unit, such as controller 28, is operatively associated with each of the material applicator 24, transparent overlay material applicator 26, laser 18, positioning mechanism 22, temperature sensor 23 and heat exchanger 50. Controller 28 controls the operation and timing of each of the applicators 24, 26, laser 18 and selective operation of positioning mechanism 22, temperature sensor 23 and heat exchanger 50.

As shown in FIG. 4, both material applicator 24 and transparent overlay material applicator 26 are shown directly located within target chamber 12. In a production operation environment, only the necessary operative portions need be located through and within target chamber 12, such as the portion through which the materials actually flow through a flow head. The supply tanks for the transparent overlay materials and other energy absorbing materials may be located outside of target chamber 12.

In operation, controller 28 controls operation of the laser processing system 10, or system 110 once initiated. As shown in FIG. 1, the method of the invention is that first, workpiece 20 is located particularly within targeting chamber 12 by positioning mechanism 22. Controller 28 activates the means for reducing the concentration of gas bubbles, i.e., either vibrator 24, activating and moving positioning mechanism 22, or controlling temperature via heat exchanger 50.

Preferably, the time between applying the transparent overlay material, establishing control over the gas bubbles and firing the laser to impact workpiece 20 occurs within approximately 0.1 to 3.0 seconds. By directing this pulse of coherent energy to the coated portion, a shock wave is created. As the plasma expands from the impact area, it creates a compressional shock wave against and passing through workpiece 20.

The above-described process or portions of the process are repeated to shock process the desired surface area of workpiece 20. Depending upon the energy levels and the amount of laser shocking desired on workpiece 20, controller 28 may position or re-index workpiece 20 into another position using positioning mechanism 22 so that the laser processing system may orient laser beam 12 to impact a different portion which may overlap the previously impacted area.

Laser 18 may be fired about every 0.5 seconds to 10 seconds. This minimum amount of time is required by laser 18 to fire again.

Depending upon the workpiece material, many parameters of the present invention may be selected to control the shock process. For example, the operator controller may select a particular laser pulse energy, laser pulse time, number of laser pulses, focal lens, working distance, and thickness of both the energy absorbing coating and transparent overlay to control the laser shock process. More particularly, laser pulse energy and laser pulse width directly affect this cycle. The amount of energy placed on the surface of the workpiece and number of laser pulses affects the depth of each shock and the speed of the shocking process. It has been found that the energy of the laser pulse, as well as other parameters should be controlled in order to optimize the process and prevent surface melting of the workpiece.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of improving properties of a solid material by providing shock waves therein, comprising:

applying a transparent overlay material to the solid material;

reducing the concentration of gas bubbles in the transparent overlay material; and directing a pulse of coherent energy to the solid material through the transparent overlay material to create a shock wave.

2. The method of claim 1 in which said method is repeated to another portion of the solid material.

3. The method of claim 1 in which said step of reducing the gas bubbles comprises vibrating the solid material to shake loose the gas bubbles attached to the solid material.

4. The method of claim 3 in which said step of vibrating said solid material comprises applying sonic waves to said solid material.

5. The method of claim 3 in which said step of vibrating said solid material comprises applying ultrasonic waves to said solid material.

6. The method of claim 3 in which said step of vibrating said solid material comprises shaking said solid material.

7. The method of claim 1 in which said step of applying a transparent overlay material comprises applying sonic vibrations before said directing of said energy pulse.

8. The method of claim 7 in which said step of applying a transparent overlay comprises applying a coat of water to the solid material.

9. The method of claim 7, in which said step of applying sonic vibration comprises applying sonic vibration to said transparent overlay material.

10. The method of claim 1 in which said step of reducing gas bubbles comprises changing the temperature of said transparent overlay material.

11. The method of claim 10 in which said step of changing the temperature of a transparent overlay material comprises applying heat energy to the transparent overlay material.

12. The method of claim 10 in which said step of changing the temperature of a transparent overlay material comprises removing heat energy from the transparent overlay material.

13. The method of claim 10 in which said step of changing the temperature of a transparent overlay material comprises flowing the transparent overlay material through a heat exchanger.

14. The method of claim 10, in which said step of changing the temperature of a transparent overlay material comprises mixing cold and hot water to reach a desired temperature.

15. The method of claim 1 further including the step of determining the concentration of gas bubbles in the transparent overlay by use of an image processor.

16. The method of claim 1 further comprising the step of confining a substantially uniform pressure pulse which is applied to the solid material.

17. A method of improving properties of a solid material by providing shock waves therein, comprising:

applying a transparent overlay material to the solid material;

applying sonic waves to said solid material into and through said transparent overlay material to shake loose gas bubbles attached to the solid material; and directing a pulse of coherent energy to the solid material through the transparent overlay material to create a shock wave.

18. The method of claim 17 further comprising the step of confining a substantially uniform pressure pulse which is applied to the solid material.

19. The method of claim 17, further comprising the step of applying ultrasonic waves to and through said transparent overlay.

20. An apparatus for improving properties of a workpiece by providing shock waves therein, comprising:

a transparent overlay applicator for applying a transparent overlay to the workpiece;

a vibration means to vibrate the workpiece to shake loose any gas bubbles attached to workpiece;

a laser operatively associated with said transparent overlay applicator to provide a laser beam through the liquid transparent overlay to create a shock wave on the workpiece.

21. The apparatus of claim 20 in which said vibration means comprises an ultrasonic transducer.

22. The apparatus of claim 20 in which said vibration means comprises a workpiece holder connected to a shaker.

23. The apparatus of claim 20, wherein said vibration means utilizes sonic energy.

24. The apparatus of claim 20, further comprising:

an image processor operatively associated with said transparent overlay; said image processor determining whether the concentration of gas bubbles in the transparent overlay is within a pre-determined limit.

25. A method of improving properties of a solid material by providing shock waves therein, comprising:

mixing a wetting agent into a transparent overlay material to reduce dissolved gas bubbles;

applying said transparent overlay material to the solid material, said wetting agent releasing gas bubbles attached to the solid material; and directing a pulse of coherent energy to the solid material to create a shock wave.

26. The method of claim 25 in which said mixing step comprises mixing said wetting agent with said transparent overlay material substantially simultaneously with when said transparent overlay material is applied to the solid material.

27. The method of claim 26 in which said mixing step comprises applying said wetting agent to said solid material before applying said transparent overlay material.

28. The method of claim 27, in which said wetting agent inhibits attachment of gas bubbles to the surface of the solid material.

29. The method of claim 25 in which said mixing step comprises mixing the wetting agent with said transparent overlay material before said transparent overlay is applied to the solid material.

30. The method of claim 25 further comprising the step of confining a substantially uniform pressure pulse.

31. An apparatus for improving properties of a workpiece by providing shock waves therein, comprising:

a transparent overlay applicator for applying a transparent overlay to the workpiece over the coated portion;

means for changing the temperature of the transparent overlay, said changing means connected to said transparent overlay applicator; and a laser operatively associated with said transparent overlay applicator to provide a laser beam through the transparent overlay to create a shock wave on the workpiece.

32. The apparatus of claim 31 in which said changing means comprises a heat exchanger.

33. The apparatus of claim 31 further comprising a temperature measurement device connected to said means, said device determining the temperature of the workpiece.

34. The apparatus of claim 31 further comprising an image processor connected to said means, said device determining whether the concentration of gas bubbles in the transparent overlay is within a predetermined limit.

35. The apparatus of claim 31, wherein said means for changing the temperature of said transparent overlay comprises one of mixing and adding hot and cold water.

36. A method of improving properties of a solid material by providing shock waves therein, comprising:

applying a transparent overlay material to the solid material;

determining that the concentration of gas bubbles adjacent the solid material is over a particular limit;

reducing the concentration of gas bubbles in the transparent overlay material; and directing a pulse of coherent energy to the solid material through the transparent overlay material to create a shock wave.

* * * * *